United States Patent Office 2,875,243
Patented Feb. 24, 1959

2,875,243

PROCESS FOR THE PRODUCTION OF 1-NITRO-NAPHTHALENE - 6 - SULFONIC ACID AND 1-NAPHTHYLAMINE-7-SULFONIC ACID

Hans Roos and Kurt Briesewitz, Leverkusen-Bayerwerk, and Josef Hegemann, Leverkusen, Germany, assignors to Farbenfabriken Bayer Aktiengesellschaft, Leverkusen, Germany, a corporation of Germany No Drawing. Application March 20, 1957
Serial No. 647,203

Claims priority, application Germany March 31, 1956

1 Claim. (Cl. 260—505)

This invention relates to a process for the production of 1-nitronaphthalene-6-sulfonic acid and 1-naphthylamine-7-sulfonic acid.

It is known that a mixture of 1-naphthylamine-6- and 7-sulfonic acids is obtained if naphthalene is sulfonated in the β-position, and is thereafter nitrated and then reduced. Small amounts of 1-naphthylamine-8-sulfonic acid are also obtained as secondary product. The separation of 1-naphthylamine-6-sulfonic acid from the 1-naphthylamine-7-sulfonic acid has hitherto either been carried out by precipitating the 1-naphthylamine-6-sulfonic acid from this mixture as the magnesium salt, or by separating the 1-naphthylamine-7-sulfonic acid as the sodium salt. Attempts which have been made to separate these naphthalene sulfonic acids at the stage of the nitronaphthalene sulfonic acids have so far not been successful. It is true that part of the 1-nitronaphthalene-6-sulfonic acid can be separated out as the sodium salt, but it is not possible in this way to obtain a complete separation of the 1-nitronaphthalene-6-sulfonic acid from the 1-nitronaphthalene-7-sulfonic acid (cf. Schulthess, Dissertation T. H. Zurich, 1944, and Comte, Dissertation T. H. Zurich, 1950). It has also already been proposed (cf. M. Cleve, Bulletin de la Société Chimique de Paris, 2, 26, page 444 (1876)) to separate the 1-intronaphthalene-6-sulfonic acid from the 1-nitronaphthalene-7-sulfonic acid by a method wherein the reaction mixture obtained after nitration of β-naphthalene sulfonic acid with nitric acid is neutralized with barium hydroxide and the precipitate thereby obtained is treated with boiling water, so that the 1-nitronaphthalene-6-sulfonic acid is largely left in undissolved form. However, this process also is not suitable for separating the two sulfonic acids (Erdman, Liebigs Annalen der Chemie, volume 275, page 251).

It has now been found that 1-nitronaphthalene-6-sulfonic acid can be separated without any difficulty from the 1-nitronaphthalene-7-sulfonic acid if the mixture of the two nitronaphthalene sulfonic acids is neutralized with calcium carbonate and then, after removal of the calcium sulfate, the 1-nitronaphthalene-6-sulfonic acid is precipitated as the barium salt by adding such an amount of a barium salt, e. g. barium chloride which is equivalent to the 1-nitronaphthalene-6-sulfonic acid.

This precipitation is preferably carried out with a slight excess of barium chloride in order to be certain to obtain the total content of 1-nitronaphthalene-6-sulfonic acid. The product obtained is then only slightly contaminated with 1-nitronaphthalene-7-sulfonic acid. From the initial product obtained in this way, the 1-nitronaphthalene-6-sulfonic acid can be obgtained in a pure form as the ammonium or potassium salt by treatment with ammonium sulfate or potassium sulfate.

The 1-nitronaphthalene-7-sulfonic acid which is contained in the filtrate and is obtained as a barium salt after the precipitation of the 1-nitronaphthalene-6-sulfonic acid and at the same time still contains a small proportion of 1-nitronaphthalene-8-sulfonic acid, is preferably further worked up by reducing the nitro group in known manner, for example in acid solution in the presence of metals such as iron, to form the amino group. By acidification with hydrochloric acid to a pH range of about 4–5, the 1-naphthylamine-8-sulfonic acid can be precipitated at a concentration of approximately 0.20 to 0.50 mol, preferably 0.35 mol of naphthylamine sulfonic acid per liter of aqueous solution, and the precipitated acid can be purified by elutriation with hot water. The filtrate obtained after the 1-naphthylamino-8-sulfonic acid has been filtered off is then concentrated to a content of approximately 0.5 to 0.9 mol, preferably 0.7 mol of naphthylamine sulfonic acid per liter, and the 1-naphthylamine-7-sulfonic acid is then precipitated by acidification to a pH value of 1–2, this 1-naphthylamine-7-sulfonic acid being obtained as the pure sodium salt after being dissolved in soda solution and allowed to crystallize.

The present process offers particular economic advantages since it permits the separation of 1-nitronaphthalene-6-sulfonic acid from 1-nitronaphthalene-7-sulfonic acid, whereas formerly it was only possible to separate 1-naphthylamine-6-sulfonic acid from 1-naphthylamine-7-sulfonic acid. 1-naphthylamine-7-sulfonic acid has a greater economic value than 1-naphthylamine-6-sulfonic acid. The relatively large amounts of 1-naphthylamine-6-sulfonic acid obtained in the former processes could not be used for any economic purposes. The 1-nitronaphthalene-6-sulfonic acids obtained by the present process, on the other hand, can for example be further processed to yield 1-hydroxy-8-amino-naphthalene-3,6-disulfonic acid which is used on a large scale.

*Example*

600 kg. of naphthalene are β-sulfonated in known manner, nitrated, and the nitration mixture is neutralized with calcium carbonate. After removal of the calcium sulfate, the concentration of nitronaphthalene sulfonic acid in the mixture is adjusted to be approximately 0.75 mol per liter, and the mixture is mixed while hot with a solution of 322 kg. of barium chloride in 600 liters of water. After the resulting mixture has been coded to 30° C., the crude barium salt is expressed and washed until clear with cold water. The 1-nitronaphthalene-6-sulfonic acid is further purified by reacting it in the hot state in 1700 liters of water with 145 kg. of potassium sulfate or 110 kg. of ammonium sulfate, freeing the solution from the barium sulfate, concentrating to 1.75 mols of nitronaphthalene sulfonic acid per liter, stirring while cold and using a suction filter for obtaining the pure potassium or ammonium salt of 1-nitronaphthalene-6-sulfonic acid at 20° C. Yield: 24% of the theoretical.

The filtrate obtained after filtering off the barium salt of 1-nitronaphthalene-6-sulfonic acid is reduced by adding 30 kg. of sulfuric acid (40° Bé.) and 300 kg. of pulverized iron. After completion of the reduction the dissolved iron is precipitated by adding magnesium oxide. The solution, freed from the iron, is adjusted to a content of 0.35 mol of naphthylamine sulfonic acid per liter and the 1-naphthylamine-8-sulfonic acid is precipitated in the hot state with 44 liters of hydrochloric acid (D=1.15). After cooling to 25° C. by stirring, the precipitated sulfonic acid is filtered off with suction. The filtrate obtained is then concentrated to a content of 0.7 mol of naphthylamine sulfonic acid per liter and the crude 1-naphthylamine-7-sulfonic acid is precipitated while hot by acidifying with 370 liters of hydrochloric acid (D=1.15). After cooling to 70° C. it is filtered off and purified by neutralizing with the necessary amount of soda in 1500 liters of water and stirring until cold. Yield: 30% of the theoretical.

From the above 1-nitronaphthalene-6-sulfonic acid the 1-hydroxy-8-amino-naphthalene-3,6-disulfonic acid can be obtained as follows:

530 kg. of ammonium sulfate are dissolved in 2300 kg. of sulfuric acid (100%) while cooling. Into this solution 918 kg. of the ammonium salt of 1-nitronaphthalene-6-sulfonic acid are introduced. Thereafter 3800 kg. of a fuming sulfuric acid (66%) are dissolved while cooling the reaction mixture to a temperature between 25–30° C. Subsequently the reaction mixture is heated for about 8 hours to about 90° C. Upon cooling to about 20° C. 300 kg. of a mixture consisting of 83% of nitric acid and 17% of sulfuric acid are added while the temperature of the mixture is maintained between 25–30° C. The mixture is maintained for another 4 hours at a temperature of 30–35° C. and then added to a solution of 840 kg. of sodium sulfate in 5500 liters of water. The precipitated 1,8-dinitronaphthalene-3,6-disulfonic acid is filtered off, introduced into 6000 liters of water and reduced at the boil by adding 400 kg. of iron powder. The dissolved iron is precipitated by adding 8–10 kg. of magnesium oxide. The filtrates obtained upon filtering off the precipitated iron are concentrated to a specific weight of about 1.17 and then acidified with hydrochloric acid to a pH of 3.5 at 80° C. The 1,8-diamino-naphthalene-3,6-disulfonic acid formed is filtered at 40° C. (yield 810 kg.). The 1,8-diamino-naphthalene-3,6-disulfonic acid can be hydrolyzed in known manner to the 1-hydroxy-8-amino-naphthalene-3,6-disulfonic acid.

We claim:

A process for the production of 1-nitronaphthalene-6-sulfonic acid, 1-naphthylamine-7-sulfonic acid and 1-naphthylamine-8-sulfonic acid from the mixture of 1-nitronaphthalene-6-, 7- and 8-sulfonic acids formed by the sulfonation and nitration of naphthalene which comprises neutralizing said mixture with calcium carbonate, precipitating the 1-nitronaphthalene-6-sulfonic acid as a barium salt, reducing the remaining 1-nitronaphthalene-7-sulfonic acid and 1-nitronaphthalene-8-sulfonic acid to the 1-naphthylamine-7-sulfonic acid and 1-naphthylamine-8-sulfonic acid and precipitating the 1-naphthylamine-8-sulfonic acid by acidifying the reaction mixture to a pH value of 4–5, and precipitating the 1-naphthylamine-7-sulfonic acid subsequently by acidifying the reaction mixture to a pH value of about 1–2.

References Cited in the file of this patent

UNITED STATES PATENTS

| | | |
|---|---|---|
| 405,938 | Andresen | June 25, 1889 |
| 1,594,547 | Nelson | Aug. 3, 1926 |
| 1,912,639 | Hitch et al. | June 6, 1933 |
| 1,996,822 | Mow | Apr. 9, 1935 |

OTHER REFERENCES

Veley: Journal Chemical Society (London), vol. 91, pp. 153–174 (1907).

Elsevier's Dictionary of Organic Compounds, Series 3, vol. 12B, pp. 4995–5002, 5007, 5008, and 5061–5084 (1955).